United States Patent [19]
Traylor

[11] Patent Number: 6,063,275
[45] Date of Patent: May 16, 2000

[54] REVERSE OSMOSIS SYSTEM HAVING AN ACCUMULATOR MEANS FOR PREVENTING CONTAMINATION OF THE SYSTEM AIR GAP

[76] Inventor: Paul L Traylor, 2691 Richter #113, Irvine, Calif. 92714

[21] Appl. No.: 08/871,823

[22] Filed: Jun. 12, 1997

Related U.S. Application Data

[60] Provisional application No. 60/020,500, Jun. 20, 1996, abandoned.

[51] Int. Cl.⁷ ...................................................... B01D 61/10
[52] U.S. Cl. .............................. 210/248; 210/97; 210/99; 138/30
[58] Field of Search ............................... 251/65; 137/429, 137/430; 138/30; 210/97, 99, 117, 119, 123, 125, 222, 232, 248

[56] References Cited

U.S. PATENT DOCUMENTS

| | | | |
|---|---|---|---|
| 2,875,788 | 3/1959 | Pier | 138/30 |
| 3,163,597 | 12/1964 | Thrun | 210/679 |
| 4,732,176 | 3/1988 | Sugimura | 138/30 |
| 5,176,165 | 1/1993 | Traylor . | |
| 5,305,778 | 4/1994 | Traylor . | |

*Primary Examiner*—John Kim
*Attorney, Agent, or Firm*—Joseph F. McLellan

[57] ABSTRACT

An accumulator for use in a reverse osmosis (RO) system of the type in which the RO reject water is routed through a backflow prevention device, and then through a conduit section to a drainage conduit for eventual emptying into a sewer system. The accumulator is mounted around the conduit section to define a water collection chamber. Any backflowing water form the drainage conduit that flows into the conduit section is allowed to pass from the conduit section into the water collection chamber, and to drain out of the water collection chamber into the conduit section when there is an absence of backflowing water.

7 Claims, 10 Drawing Sheets

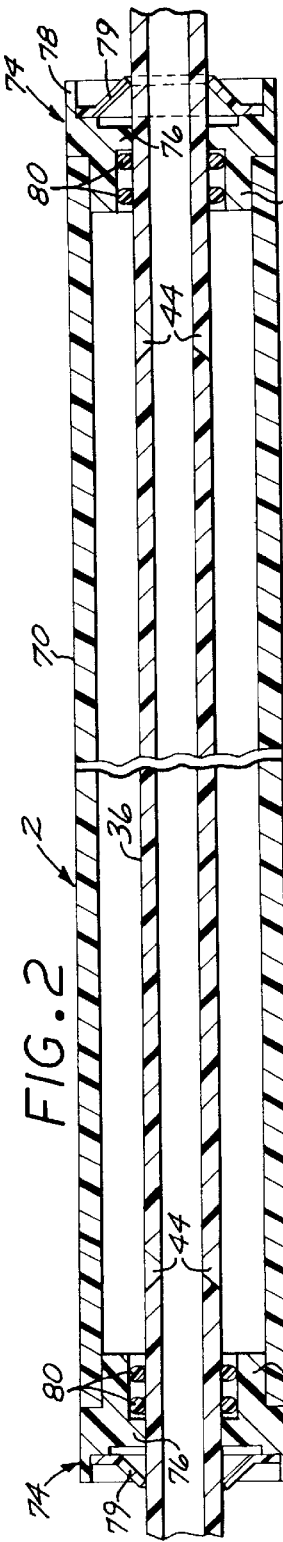
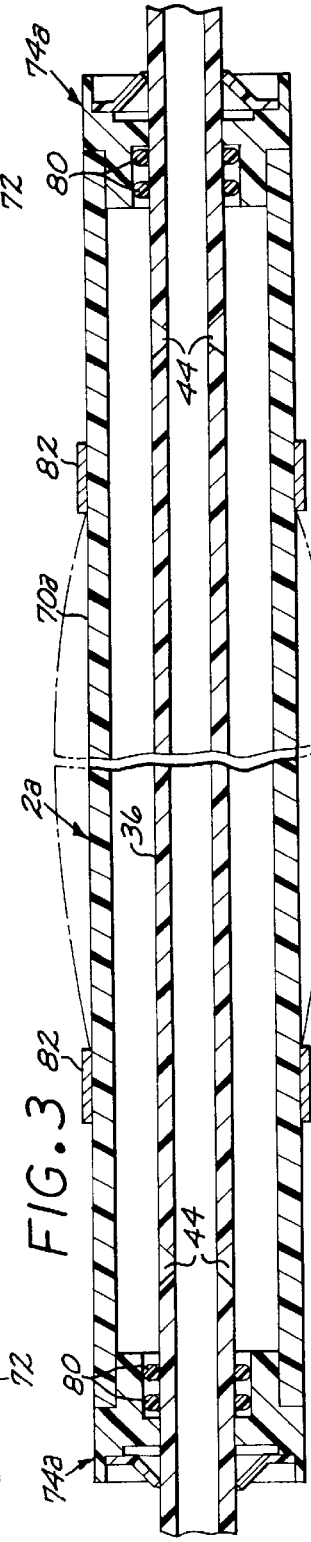
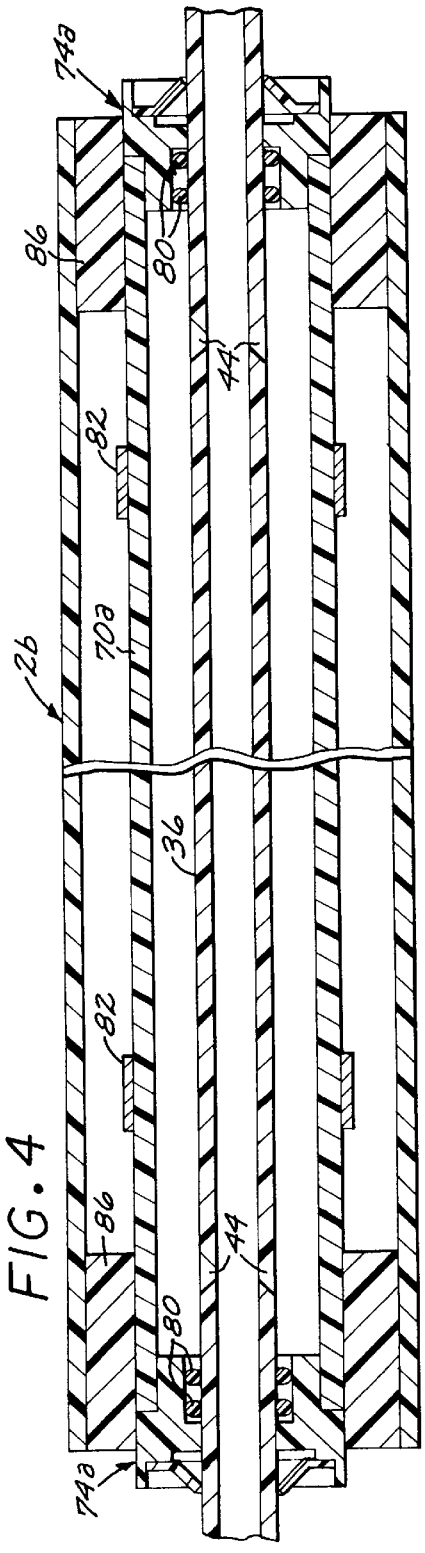

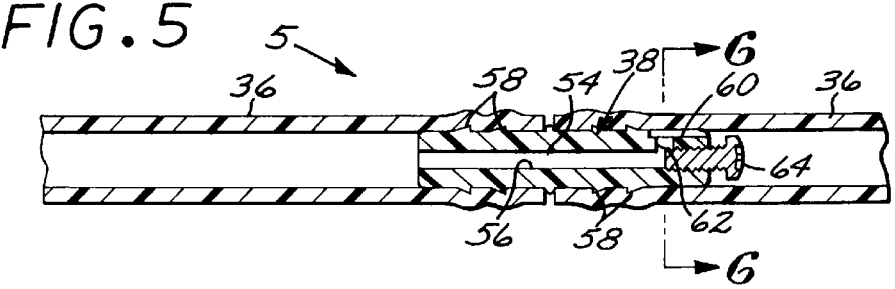
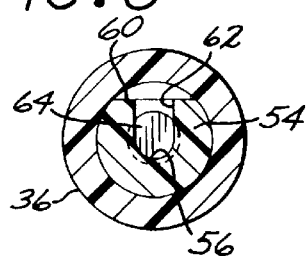
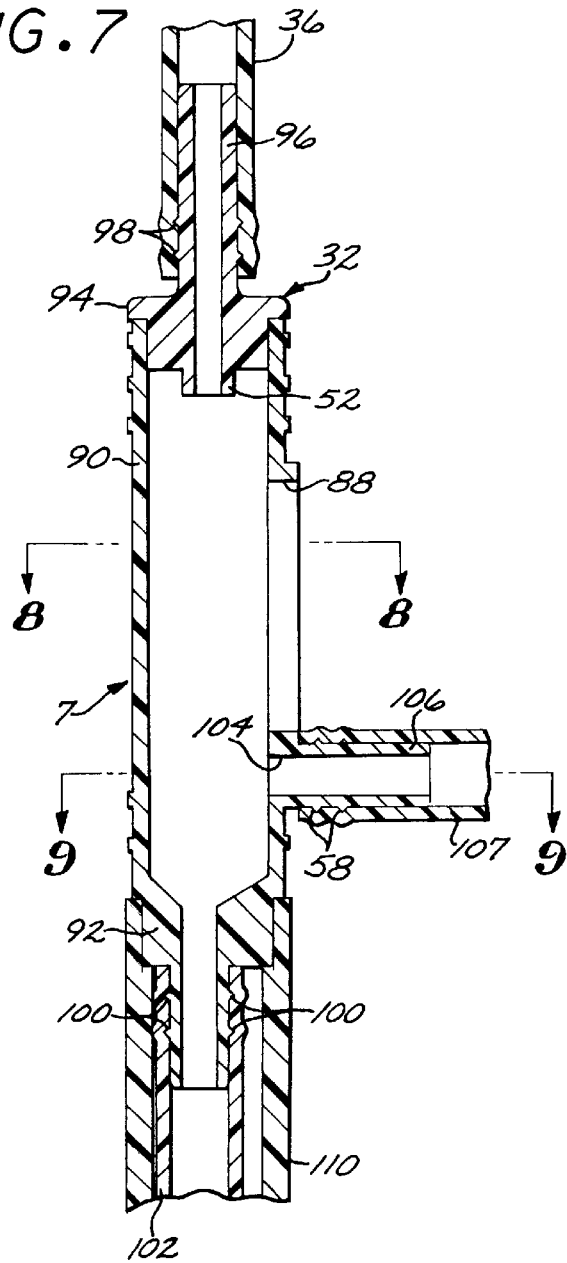
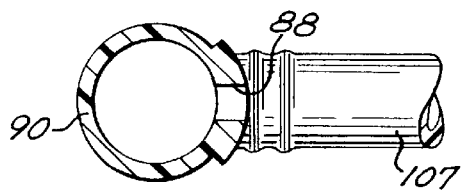
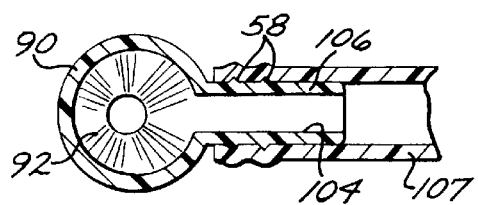

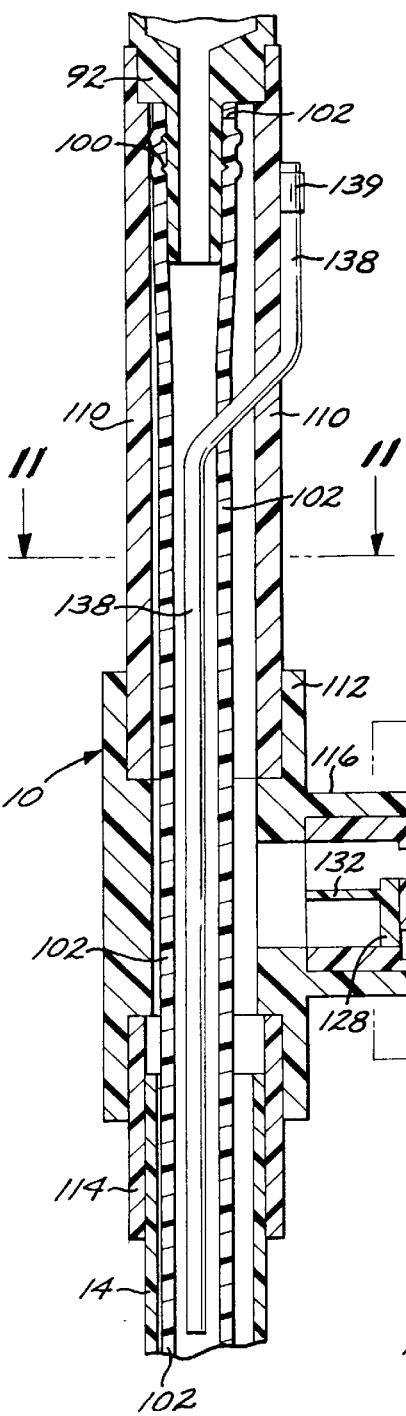

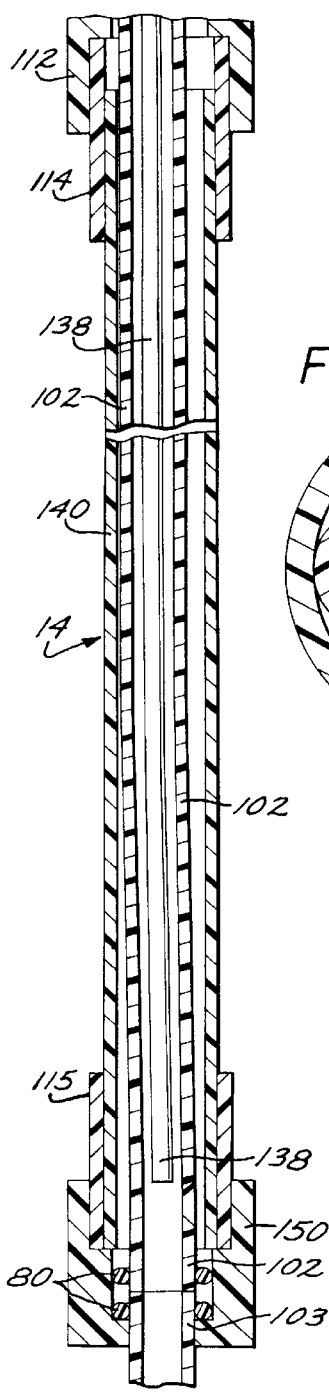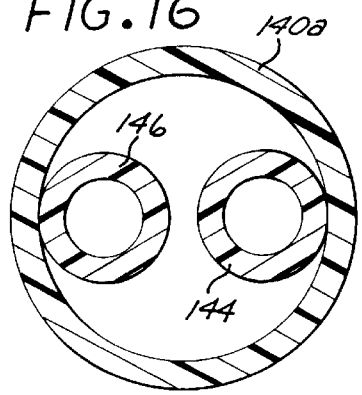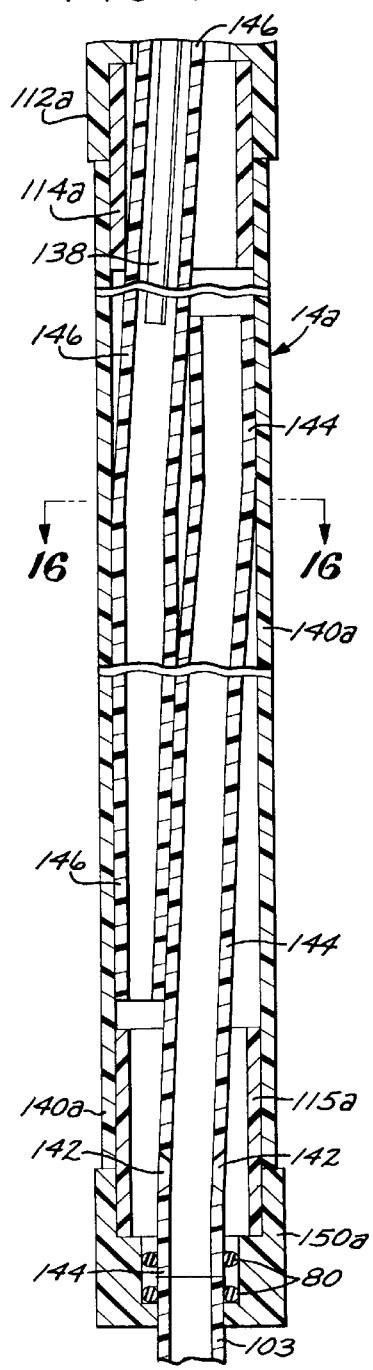

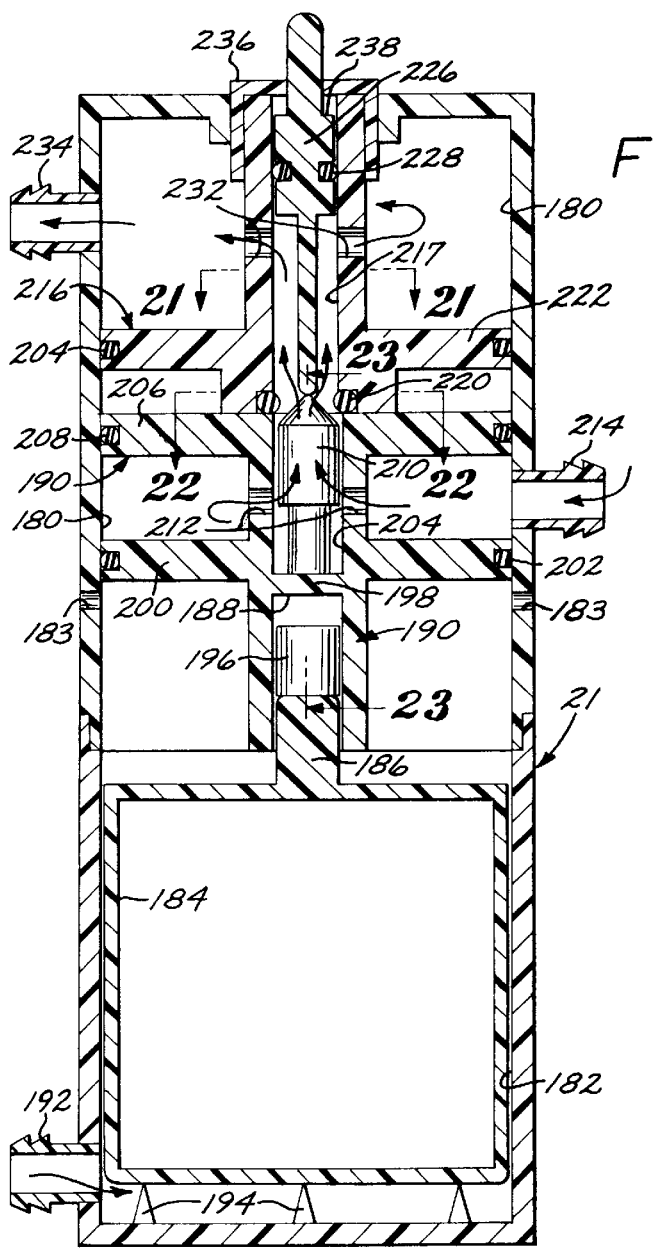
FIG.20
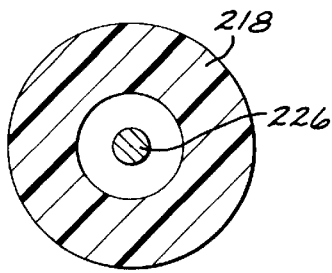
FIG.21
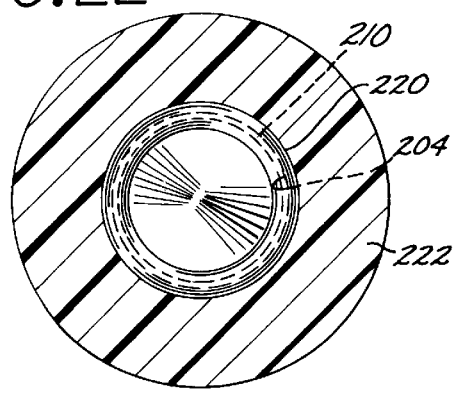
FIG.22
FIG.23

REVERSE OSMOSIS SYSTEM HAVING AN ACCUMULATOR MEANS FOR PREVENTING CONTAMINATION OF THE SYSTEM AIR GAP

CROSS REFERENCE TO RELATED APPLICATIONS

This application claims the benefit of U.S. Provisional Application Ser. No. 60/020,500, filed Jun. 20, 1996, now abandoned in favor of the present application Ser. No. 08/871,823;

BACKGROUND OF THE INVENTION

1. Field of the Invention

The present invention relates to a reverse osmosis system having an accumulator means for receiving and temporarily holding or shunting away any excess backflow water from the associated sewage system. The accumulator means can also be configured to perform a similar function for a higher than normal flow of reject water from the reverse osmosis unit. In either situation the excess water is prevented from reaching and contaminating or flooding the air gap in the system.

2. Description of the Prior Art

Reverse osmosis (RO) units accept source water under pressure from a municipal water supply or the like. The supply pressure forces a portion of the source water through a special membrane to produce potable or high quality drinking water. The water which does not pass through the membrane is waste or reject water which flows into a drain line connected to the sewer system. The typical slow drip flow of the RO reject water is often annoyingly audible to a householder, which is particularly true when the RO unit is located under the kitchen sink.

In many RO units the reject water flows constantly at the slow drip rate, but in more recent RO models the production of potable water is automatically stopped when the potable water tank of the RO unit is full or nearly full. This of course also stops the flow of reject water as well.

Potable water from the outlet of the RO tank typically passes upwardly through flexible tubing to a dispensing faucet located on or above the sink countertop of the household. The reject water has a high concentration of solids and other contaminants and it is directed toward a drain line for emptying into the sewer system. However, it first flows under pressure from the RO unit outlet, through flexible tubing, and then through a system backflow prevention device which meets plumbing code requirements. This is usually an air gap located on the countertop and open to atmosphere for venting.

The reject water flows primarily under the force of gravity through the air gap portion and into a drain line connected to the sewage system. Located as it is between the supply of potable water and the drain line, the air gap portion prevents any vacuum from forming in the system. This prevents back siphoning or backflow of sewage water from the drain line and into contact with the air gap portion.

Sewer water backflowing past the air gap portion of the air gap unit, or backing up into the air gap portion, is considered to have contaminated the water supply or to present likelihood of contamination.

Most plumbing codes specify that an RO air gap unit must be located above the highest level that the rising backwater can reach, which is why it is common to locate the air gap unit on or above the sink countertop, even though this location is often unsightly and does almost nothing to conceal the sound of the dripping RO reject water.

A typical sewer stoppage prevents normal forward or drainage flow of water into the sewer. Consequently, any water from the household, including RO reject water, causes a gradual rising or backflow of contaminated water from the sewer line. Unless there is some provision for stopping this contaminated backflow, or shunting it somewhere, it very quickly reaches and contaminates the air gap. Usually it simply spills out of the air gap portion and onto the kitchen counter or other adjacent surface.

For brevity, the air gap portion is often referred to as the air gap, and the same applies to air gap unit, which is also sometimes referred to as the air gap for convenience.

Obviously, it is desirable to provide a means for preventing contamination of the air gap by such slowly rising drain or sewage water.

Contamination also results from high velocity backflows, such as would occur when a sudden high vacuum in the household water system is caused by opening of a nearby fire hydrant. Such a high velocity backflow is more likely to be caused when a householder uses a plunger, aerosol "bomb" or the like to develop a localized high pressure to try and clear the stoppage.

The localized pressure produces a sudden spurt or surge of contaminated backflowing water that relatively easily spurts across and contaminates the typical air gap. Special air gaps have been devised to prevent this, including the air gap that is disclosed in my U.S. Pat. No. 5,176,165, entitled "Air Gap Apparatus". The patented air gap includes a diverter passage and flow deflector that is effective to channel to atmosphere very rapid or explosive backflows so that they cannot reach or spurt across the air gap and contaminate or potentially contaminate the potable household water supply.

It is only recently that there has been any widespread recognition of the contaminating effect such backflows can have on the air gap in an RO system. A satisfactory way of stopping or safely accommodating such backflow surges is clearly needed.

Simple check valves located downstream of the air gap might appear to be a feasible solution since they would block undesired upstream flow, but plumbing codes prohibit their use for this purpose. The codes are based upon the assumption that after service in drainage systems, check valves cannot be relied upon to seat properly in the presence of foreign materials in such systems.

Check valves are also disadvantageous because they require a spring bias to keep them seated against slowly rising backflow. This also affects normal or drip flow of reject water since the valves would open only when the reject water backs up enough to develop a pressure sufficient to overcome the valve bias.

The reject water flows in such small quantities and at such low flow rates that it will not flow through the typical small bore tubing leading to the drain outlet if there is any kind of obstruction or blockage. A valve that is biased to a closed position looks like a blockage to the forward flowing reject water, and it will cause the reject water to back up and rise enough to reach and contaminate the air gap before the valve opens to empty the reject water into the drain outlet.

The air gap can also be contaminated or overloaded by an excessive forward flow of reject water from the RO unit. In certain recent models of RO units, the special membrane through which source water is forced to produce potable water is automatically periodically purged or flushed. This is done by allowing a relatively high volume of source water to flow over the membrane to flush away foreign contaminants that collect on the membrane surfaces and reduce the efficiency of conversion of the source water to potable water.

Instead of providing oversize plastic tubing and associated fittings and alternate flow passages to accommodate the occasional high flow of flushing water from such an RO unit, it is preferable to continue the use of the lower cost and more easily handled small diameter tubing and fittings used with non-flushing RO units. The smaller tubing is more than adequate to handle normal low flow reject water, which is in the order of about two to five ounces per minute. As will be seen, the present invention provides a means to accommodate the temporary surge of RO purging water without having to increase the size of the drain tubing and the other components in the system.

SUMMARY OF THE INVENTION

According to the present invention, an accumulator means is provided which includes an accumulator adapted to accept and temporarily hold a quantity of backflow water, particularly high velocity backflow water which might otherwise spurt through the drain lines and contact and contaminate the air gap and the parts of the system leading to the potable water supply.

It has been found that such an accumulator can be made so that it also masks or muffles the undesirable sound of dripping RO reject water.

As will be seen, the accumulator can also serve as a temporary booster to convey the gravity flowing reject water greater distances and greater heights than would otherwise be possible.

Such an accumulator can also be used in combination with a unidirectional flow resistance device, preferably located next to the sewer connection and operative to limit or block high velocity contaminated backflow water flowing toward the accumulator. Such a unidirectional flow resistance device can be designed and configured to allow normal forward flow of RO reject water, and yet block or substantially block fast or slowly rising backflow water.

In yet another embodiment of the invention, a bidirectional flow regulating device may be used downstream of the accumulator. The bidirectional device slows or chokes off high velocity backflows so that such backflows never reach the accumulator, or only result in a minor increase in the level of backflow water in the accumulator. The device is adjustable to permit normal forward flow of RO reject water, and can be located adjacent or even inside the accumulator for certain applications.

When used alone, such an accumulator is preferably made relatively large compared to the small drain tubing used in RO drain systems. This has the effect of immediately attenuating the velocity of a spurt of backflowing sewage water as it enters the larger volume of the accumulator. The accumulator is appropriately vented to atmosphere to allow accumulated sewer water to drain out once the sewer blockage is cleared. The accumulator also may serve as a container for chemically treated particulate matter operative to render water passing through it free of bacterial contamination, or for other purposes, as desired.

Such an accumulator can be combined with other features, such as overflow outlets to drain off unusual and prolonged sewage backflows so that such backflows do not reach the air gap.

As indicated previously, the accumulator is also useful as a pressure booster in special situations where it is difficult to drain RO waste water through tubing that extends some distance from the RO unit, or where the RO water must flow to a level slightly higher than the outlet from the RO unit, as would be the case when reject water is drained from an office water cooler into a toilet tank, for example, for want of a more convenient drain outlet.

In such instances the slowly flowing RO water is captured in the accumulator until enough water is collected to develop a pressure head. At some point the pressure head is sufficient to drive the water a significant distance through the relatively small drain tubing, aided by the inertia of the suddenly released water rushing through the tubing. Such an accumulator can periodically or cyclically convey RO waste water to a higher level and over longer distances than would be possible by simply directly draining the waste water into the relatively small tubing of the drain system.

A second accumulator can be incorporated in the RO system, either separately or in addition to the accumulator just mentioned, to accomplish a related function. Where the RO system is characterized by a periodic sudden increase in the volume of reject water, as would occur during a purging or flushing operation, the excess flow over normal is accepted and temporarily stored in the second accumulator until the flushing cycle is over, at which time the accumulator empties at or near the usual reject water flow rate. This avoids overdriving and probable flooding of the air gap, and otherwise overloading the flow lines and fittings in the RO reject water flow system. Also, the accumulator provides almost no resistance to the flow of RO flushing water, as compared to the usual drain tubing.

In another embodiment of the invention, an automatic shut off means is incorporated in the source water input to the RO unit. In the event that there is a downstream blockage, or membrane failure or some malfunction in the RO unit that causes excess reject water to accumulate and possibly flood the air gap, or escape through overflow ports or the like, the excess flow will trigger the shut off means. This terminates the pressurized water supply to the RO unit, and thereby stops the flow of excess RO waste water.

Various venting options are also available in the different downstream accumulator embodiments, including incorporation of such vents in the accumulator wall, in tubes located internally of the accumulator, or in the air gap. Also, safety or emergency overflow lines can be connected to the accumulator to drain it if extremely high backflow rates are encountered.

Ancillary improvements can also be incorporated in the various combinations of components according to the invention to facilitate rapid and easy connection of such components to other components. These include special push-in assembly of a component to flexible tubing, or insertion of flow limiters and flow regulators into other components of the particular RO system.

In addition, the character of the accumulator means can be adjusted for special situations. For example, if the walls of an upstream pressurizable accumulator were made resilient, the accumulator is not only adapted to receive excess water flow, but the accumulator can deliver such water to the air gap inlet under some degree of pressure even though the air gap inlet is located at a level higher than the accumulator.

Various venting methods are employed to vent the accumulator to allow drainage of backflow water from the accumulator once the sewer stoppage is removed and it is desired to drain the accumulated water into the sewer line. One embodiment of air gap is disclosed which provides for a combination of venting of the accumulator and carrying away any overflow from the accumulator.

Similarly, in yet other embodiments, a selection can be made of various flow resistance devices, flow control devices, venting and overflow ports for various applications. The present system is capable of accepting various combinations of such devices simply and quickly. Push in connections are effective to seal the devices in the tubing in which they are installed, without stressing the tubing and developing stress cracks and consequent leakage.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 2 is an enlarged longitudinal cross sectional view of the upstream accumulator of FIG. 1, which is located upstream of the air gap unit;

FIG. 3 is a view similar to FIG. 2, but illustrating a second embodiment of an upstream accumulator;

FIG. 4 is a view similar to FIG. 2, but illustrating a third form of upstream accumulator;

FIG. 5 is a longitudinal cross sectional view of a flow limiter adapted to also serve as a tubing coupling by insertion at various selected locations in the RO system, such as downstream of the upstream accumulator;

FIG. 6 is an enlarged view taken along the line 6—6 of FIG. 5;

FIG. 7 is a longitudinal cross sectional view of one of many forms of air gap units which can be used in the present RO system, the air gap unit illustrated being located just downstream of the flow limiter of FIG. 5;

FIG. 8 is a view taken along the line 8—8 of FIG. 7, showing the cross section as if the air gap unit were solid and not sectioned in FIG. 7;

FIG. 9 is a view taken along the line 9—9 of FIG. 7, and showing the cross section as if the air gap unit were solid and not sectioned in FIG. 7;

FIG. 10 is an enlarged longitudinal cross sectional view of a safety overflow and venting fitting located downstream of the air gap unit and upstream of the downstream accumulator, the fitting being selectively operative for venting the accumulator and for carrying off any waste water that may have backed up to a level upstream of the accumulator;

FIG. 11 is an enlarged view taken along the line 11—11 of FIG. 10;

FIG. 12 is an enlarged view taken along the line 12—12 of FIG. 10, and illustrating a first vent/overflow position;

FIG. 12A is an enlarged view taken along the line 12A—12A of FIG. 10, and illustrating the different axial locations of the two tubular elements 124 and 126;

FIG. 13 is a view similar to FIG. 12, but illustrating a second vent/overflow position;

FIG. 14 is a longitudinal cross sectional view of one embodiment of a downstream accumulator;

FIG. 15 is a longitudinal cross sectional view similar to FIG. 14, but illustrating a second embodiment of downstream accumulator;

FIG. 16 is an enlarged view taken along the line 16—16 of FIG. 15;

FIG. 20 is an enlarged cross sectional view of an automatic shut down valve for cutting off source water to the RO unit when a predetermined quantity of backflowing water from the drain lines is detected;

FIG. 21 is an enlarged view taken along the line 21—21 of FIG. 20;

FIG. 22 is an enlarged view taken along the line 22—22 of FIG. 20;

FIG. 23 is an enlarged view taken along the line 23—23 of FIG. 20;

DESCRIPTION OF THE PREFERRED EMBODIMENTS

General System

Figure 1:
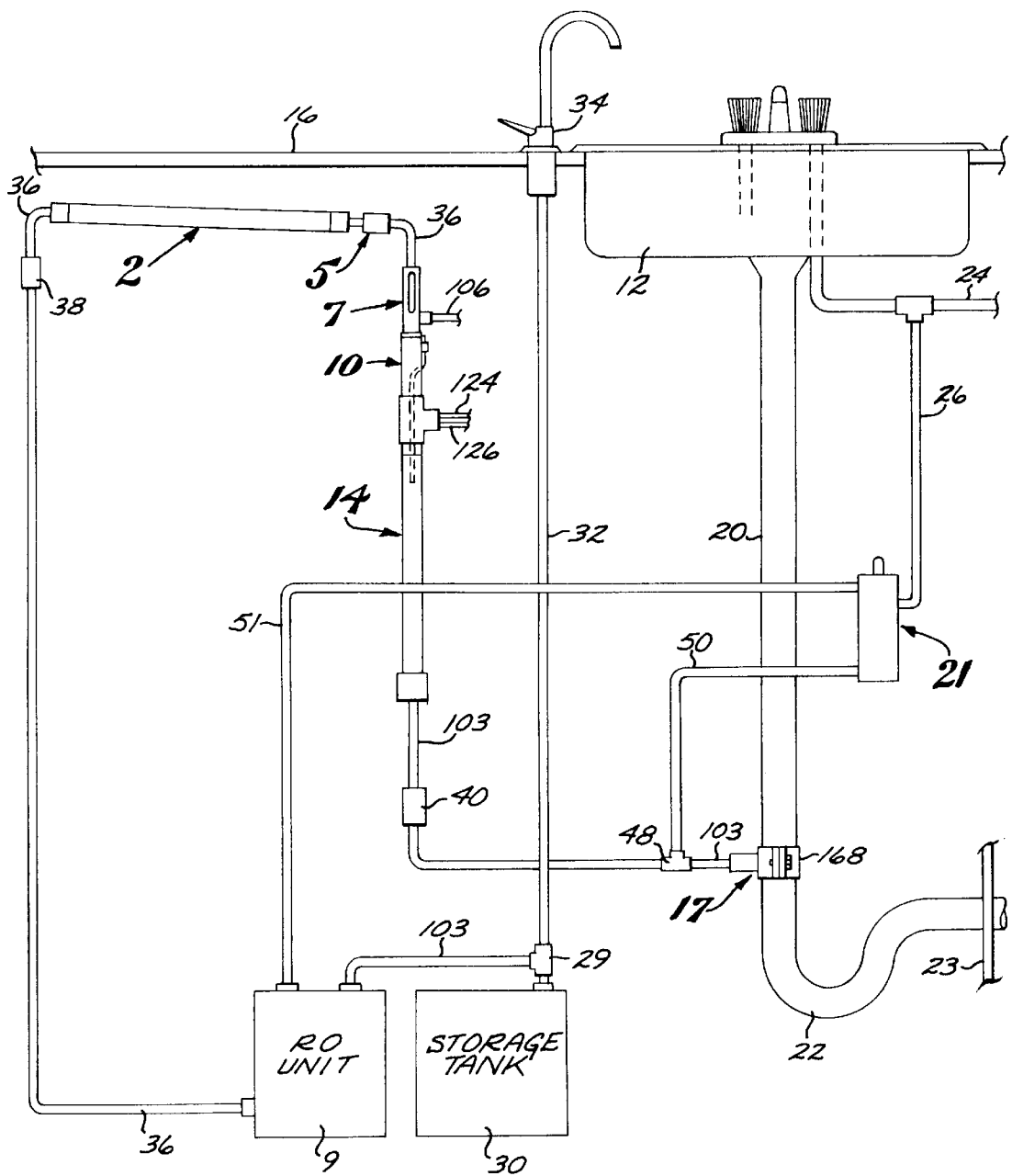
FIG. 1 is a schematic representation of an RO system incorporating both an upstream and a downstream accumulator, as well as a surge block and flow resistor that is located downstream of the accumulator to substantially block any backflow into the accumulator, it being noted that the upstream accumulator may be omitted in many applications, it being further noted that the boldfaced numbers adjacent certain components refer not only to the overall component, but also to subsequent FIGS. in which such components are illustrated in more detail.

Referring now to FIG. 1, the illustrated RO system or unit 9 can be located in any of various positions and attitudes, depending upon the particular application.

In the usual household installation, the RO system is located beneath a sink 12 that is supported by a kitchen counter 16. The sink 12 empties into a drain line 20 that is connected to a conventional "P" trap 22 which extends through a wall 23 for connection to a sewer line (not shown).

A conduit 24 is connected to a water source such as the municipal water supply system to supply source or feed water for the RO unit 9. The flow of feed water is under the control of a supply water shut off valve (not shown).

Water from the conduit 24 flows through a conduit 26 to an automatic shut down valve 21. From the valve 21 the water flows into the RO unit 9.

The water source pressure forces a portion of the supply water through a special RO membrane (not shown) in the RO unit 9. This produces potable water that flows through a connecting conduit 103, and through a T-fitting 29 into either a storage tank 30 or a conduit 32 leading to counter faucet 34, depending upon whether the faucet has been turned on for the dispensing of water to a user. Water that is not forced through the RO membrane becomes waste or reject water that flows from the RO unit through its outlet port and into a conduit 36. The water then flows through a flow limiter 38 that is located upstream of an upstream accumulator 2.

Reject water leaving the accumulator then flows through another flow limiter 5, and into the system air gap 7. The particular air gap 7 illustrated is merely exemplary. It may take any one of various forms, some of which include special venting arrangements and backflow shunting openings, or special end fittings for attachment to various sizes of flexible tubing or rigid conduit, as will be described in more detail hereinafter.

The reject water flowing to the air gap 7 flows by gravity past the T-fitting 112, as seen in FIG. 10, of a safety overflow and venting fitting 10. The fitting 10 is attached to the upper extremity of a downstream accumulator 14, so the water flows through the accumulator to a flow limiter 40 that is located downstream of the accumulator.

From the flow limiter 40 the reject water flows through a T-fitting 48, and through a flow resistor 17 to a saddle clamp 168. The clamp is connected to the drain line 20 for passage of the reject water into the drain line. Upstream of the flow resistor 17 any water backflowing from the drain line 20 has a path from the upper leg of the T-fitting 48, and into a conduit 50 leading to an automatic shutoff valve 20 for cutting off further flow of source water through a conduit 51 to the RO unit 9 when the backflow reaches a certain level, as will be seen.

Operation and Component Details

Although the air gap 7 is capable of handling a typical reject water flow rate of about 60 ounces per minute, this is far greater than usually is necessary, and far more than the components, orifices and tubing located downstream of the air gap can handle without backing up and flooding out one or more of the openings in the air gap or the vent and overflow ports located downstream of the air gap. In this regard, the tubing is preferably relatively small flexible plastic material such as polyethylene in the order of one quarter or three eighth inches in outside diameter.

Tubing is favored because it is relatively inexpensive in its smaller sizes, and it can easily be formed or curved around obstacles for connection to RO components under a sink or in other cramped quarters. It is also durable and not susceptible to corrosion. It is so commonly used that a variety of end connections can be obtained for coupling the tubing to larger, higher water capacity rigid conduit, or to RO components. For example, so-called quick "push fit" connectors are widely available on the market. Such fittings do not form a part of this invention and therefore will not be described in detail.

Another reason push fit connections are so common is that pressure in the drain lines is relatively low, and a leak tight fitting can easily be achieved by properly configuring and sizing the tubing attachment elements of the RO components, and preferably by also providing the elements with gripping ribs or ridges or the like to grip the tubing when it is pushed over the elements. If the ridges are of the proper size and placement, the connection will be leak tight without stress fracturing of the tubing over extended periods of use. Movement of water past such connections is mostly by gravity flow, but the fitting connections made according to the present invention have also been found to be leak tight under the typical line pressure to the household.

Typically, the tubing is cut where a connection is desired, and the cut end is then pushed over the tubing attachment element of the RO component. Also, components like the flow limiters described in this application can be pushed into the adjoining cut ends for connecting the cut ends, as will be seen.

For example, the typical ⅜ inch plastic tubing has an inner diameter of ¼". As will be explained later in connection with FIG. 17, the components in the present system usually include a rigid, longitudinally extending tubular end connection which is adapted to be pushed into the ¼ inch opening in the tubing. For this purpose the outer diameter of the end connection is made smooth and preferably 4–8 thousandths larger in diameter than the ¼ inch internal diameter.

The tubing is slidable over approximately two thirds the length of the outer end of the end connection. It is then pushed farther over the inner half of the length of the end connection, where it encounters a plurality of annular ridges or grippers formed on the circumference of the connections, as by molding or the like.

The smooth outer portion of the end connection provides a tight fit or seal, while the grippers constitute a mechanical connection at the inner portion to provide joint integrity.

The grippers are suitably longitudinally spaced apart, and their diameter is made just large enough to add about 10–20 thousandths to the radius of the end fitting. Each grips the plastic tubing in a relatively small area.

Roughly analogous grippers exist in the prior art. They were originally designed for rubber tubing, and later also used with vinyl tubing. In these applications they were generally satisfactory. However, they have also been used with the polyvinyl and polypropylene tubing commonly used in RO systems. In this application the grippers are usually spaced apart over the full length of the end connection, biting into the tubing over a relatively long section and creating a running stress. The prior art grippers are much larger than the grippers used in this invention, adding about 25–30 thousandths to the radius of the end fitting. Apparently this was intended to insure a watertight seal. However, just the opposite has been found to occur because the design stretches the RO plastic tubing over the full length of the end connection. This unduly stresses the tubing, causing it to split and fail over a period of time.

The arrangement of the present invention adopts a different approach, and uses the smooth portion of the end connection to provide the seal, while the grippers on the inner end of the end connection provide a mechanical anchorage, and their diameter is reduced so as to provide such an anchorage, but without the stressing of the tubing that causes splitting and cracking. The dimensions utilized in the present arrangement do not change significantly with larger tubing diameters, inasmuch as the wall thickness of the plastic tubing commonly used is all about one sixteenth of an inch.

Typically, the plastic tubing is cut where a connection is desired, and the cut end is then pushed over the end connection of the part or component. Thus, flow limiters like those described later in the application can be pushed into the adjoining cut ends wherever desired, as will be seen.

Also, although a push fitting of the components into the plastic tubing is favored for reasons of cost and simplicity, it will be apparent that retention of the fitting ends in the tubing can be achieved in any number of ways, as by adhesive, threading, etc. The present invention comprehends the use of any connection effective to couple the components to the plastic tubing.

Likewise, the use of rigid or semi-rigid tubing or piping is also within the scope of the present invention. Sometimes the use of rigid PVC conduit is preferable. It is inexpensive, widely available, and capable of rapid adhesive assembly. It is also available in translucent form, which is important in certain applications of the present invention, as will be seen. The use of such rigid pipe dictates a different kind of assembly, but the present invention comprehends use of these and similar materials since they do not significantly affect the operation of the invention. Often connections between components are only schematically indicated, but it will be understood that any of the commonly available means for connection can be used. As previously mentioned, the low pressures present in the RO drain lines is relatively forgiving and not productive of the leaks sometimes present in high pressure plumbing systems. The connections described in this application are adapted to be leakproof not only at such low pressures, but also at pressures in excess of approximately 100 pounds per square inch. In this regard, the aerosol "bombs" often used to clear obstructions can generate pressures in the order of 5 to 15 pounds per square inch.

As previously indicated, it is highly desirable that the rate of flow of RO reject water be adjustable to a rate that the tubing and RO components can handle, so that reject water does not flow out of any vents or overflow openings to atmosphere.

According to the present invention, several means are provided to accomplish this adjustment or control. One or all may be used, depending upon the degree of redundancy desired. Many of such means are illustrated in a single exemplary embodiment, but ideally only a few will be used as a practical matter, as will be seen.

The upstream flow limiter 38 is located in the conduit 36 downstream from the RO unit. It is also located upstream of the upstream accumulator 2, which is in turn located upstream of a second flow limiter 5.

Details of the flow limiters 38, 5 and 40 are set out in FIGS. 5 and 6. The limiter 38 is identical to the other limiters 5 and 40 and comprises an elongated central body 54 having a central bore 56. It is installed in the ⅜ inch polyethylene tube or conduit 36 at any desired location by simply cutting the conduit 36 at that location and pressing the extremities of the body 54 into the cut ends.

The opposite extremities of the body 54 include a plurality of longitudinally spaced apart circumferential grippers, ridges or ribs 58. As previously discussed, these ribs 58 are precisely dimensioned to press against the inner walls of the flexible conduit 36 to provide a fluid tight relation, but not so tightly as to induce stress cracks in the conduit.

One extremity of the body 54 is provided with an external flat 60, as best seen in FIG. 6. The flat 60 includes a transverse water passage 62 that opens through the flat 60 and into the bore 56 of the limiter body 54. The extremity of the bore 56 adjacent the passage 60 is threaded to receive a threaded screw 64.

The unthreaded end of the body 54 is inserted into one of the cut tube ends. The longitudinal position of the screw 64 is adjusted by using a suitable screwdriver to turn the head of the screw 64 until the rate of flow of water through the bore 56, the passage 62, and across the flat 60 into the bore of the downstream conduit 36 is satisfactory. Once the screw 64 is adjusted, the threaded end of the limiter 5 is inserted into the other cut end of the tubing. In this position the screw 64 is recessed, which reduces the opportunity for anyone to tamper with the adjustment. On the other hand, if adjustment is necessary, the tubing is easily cut, the adjustment made, and the limiter repositioned as before. The position of the flow limiter 5 can be changed for special purposes, as will be seen, since it can be located in the system tubing almost anywhere in the system. In this regard, it is noted that the flow limiter 5 is a bidirectional flow control device. It is adapted to limit the flow of water in either direction, which is useful in certain applications.

Preferably the flow limiters 38 and 5 are adjusted to restrict the flow rate the limiter 5 more than the flow rate through flow limiter 38. The flow orifice in the flow limiter 5 is also made such that it is smaller than the orifice in the inlet nozzle 52 of the air gap 7. With this arrangement any excess flow from the RO unit 9 will first back up and flow into the upstream accumulator 2 including, as will be described, any upstream surges due to periodic flushing of the RO membrane. Such surges cannot then reach the air gap 7 and exceed its capacity to pass on the flow of the reject water.

Obviously, adjustments other than the size of the flow orifice can be made in the limiter 5 to adjust the flow rate through it, if desired, such as making the flat 60 or the passage 62 larger.

Even if the limiter 38 were inadvertently omitted, or considered redundant and deliberately left out, the accumulator 2 will be effective to absorb sudden surges from the RO unit caused by membrane flushing or the like. The construction and operation of the limiter 5 are just as was described for the limiter 38.

As best seen in FIG. 2, water flowing from the conduit 36 flows into the accumulator 2. Preferably, instead of splicing an accumulator conduit to the conduit 36, the conduit 36 is made continuous so that it extends through the full length of the accumulator 2 along its longitudinal axis.

During normal RO reject water flow, the flow is normally regulated by components within the RO unit, but subsequent to leaving the RO unit the flow is controlled by the flow limiter 38 such that the air gap is not overloaded or flooded. Some RO units are periodically flushed with water in order to remove collected contaminants on the RO membrane. When this occurs the increased flow will not be able to flow through the preadjusted flow limiter 5, and will escape from the interiorly located conduit 36 through small openings 44 formed in the walls of the conduit 36. The size number and location of such openings will vary according to suit the needs of the system, but ordinarily the openings 44 are located adjacent the opposite extremities of the accumulator 2.

In order to form an annular space within which this excess water can collect, the conduit 36 is surrounded by a longitudinally extending cylinder 70 which is generally coaxial with the internal conduit 36. In the embodiment illustrated in FIG. 2, the cylinder 70 is made of rigid translucent plastic material, and its opposite extremities extend over and are adhesively secured to the outer surfaces of a pair of cylindrical hubs 72 that form part of a pair of end fittings 74, respectively.

Each fitting 74 includes an inner central recess within the hub 72 to receive a pair of sealing O-rings 80 which bear against the conduit 36 to form a water tight seal. Each fitting 74 also includes a cylindrical flange 78 which is engaged on its inner face by the end of the adjacent cylinder 70. A spring clip or retainer 79 engages the outer face of the flange 78 and the conduit 36 to constrain the conduit 36 against unwanted longitudinal movement. For this purpose the retainer includes a central opening to receive the conduit 36, and a plurality of yieldable spring leaves or fingers (not shown) of the retainer 79 allow the conduit 36 to be pulled past the fingers in one direction, but the fingers will dig in and prevent the conduit from thereafter being pulled in the opposite direction.

Water flow into the accumulator 2 from the openings 44 collects in the annular space defined between the conduit 36 and the cylinder 70 and end fittings 74. If desired, the space can be vented to allow air to escape while the filling of the accumulator occurs, but this is usually not necessary since the water flow from the RO unit outlet is under water source pressure.

Any excess flow thus collects in the accumulator 2 until the temporary flow or surge dissipates, at which time the collected water in the accumulator slowly flows back into the conduit 36 through the openings 44.

If desired, granules or particulate matter, as generally indicated at 37, can be placed in the accumulator 2, either in the annular space between the conduit 36 and the cylinder 70, or in the conduit 36, or both, as illustrated. These can be chemically treated to kill bacteria which may exist in the water flowing through the accumulator. This arrangement of particulate matter can be provided in any of the accumulators of the present invention, as seen in FIG. 15 for example. Silver iodinated resin particles are an example of such particulate matter.

FIGS. 3 and 4 illustrate further embodiments of accumulator which may be used in the present system. These embodiments include some components which are identical to components of the embodiment of FIG. 2, in which case identical numerals are used. Certain other components perform a similar function, in which case the subscript "a" is used in FIG. 3, and the subscript "b" is used in FIG. 4. New or additional components are assigned different numerals.

In the embodiment of FIG. 3 a cylinder 70*a* is employed which is made of suitable flexible plastic or elastomeric material capable of elastically stretching or distending upon being filled with water under pressure. This increases the water holding capacity of the annular space between the conduit 36 and the cylinder 70*a*. In addition, once the high rate flow condition which is responsible for filling of the annular space abates, the elasticity of the cylinder 70*a* promotes more rapid draining of the annular area into the conduit 36 through the openings 44.

The cylinder 70*a* is adhesively secured at its opposite extremities over portions of the outer surfaces of a pair of cylindrical sleeves 76. Other portions of the outer surfaces fit and are adhesively secured within the annular recesses of a pair of cylindrical end fittings 74*a*, respectively. The fittings 74*a* each includes a blind bore which receives a pair of O-rings 80 to provide a water tight relation with the conduit 36.

In order to limit the expansion or stretching of the cylinder 70*a* for safety purposes, a pair of stainless steel bands 82 or other suitable restraints are arranged to encircle the cylinder 70*a* in the regions adjacent the inner extremities, respectively, of the pair of sleeves 76. With this arrangement only the length of the cylinder 70*a* between these extremities is free to outwardly expand.

Yet another embodiment is illustrated in FIG. 4, this embodiment being different primarily in the employment of an elongated cylindrical safety sleeve 84. The sleeve 84 is made of rigid plastic material, often translucent in order to observe the water levels and operation, and its opposite extremities are slipped over and adhesively attached to a pair of cylindrical spacers 86 which are slipped over and adhesively secured, respectively, to the pair of end fittings 74*a*. The safety sleeve 84 affords protection against any possible destructive overexpansion of the cylinder 70*a*, which might allow water to escape from the accumulator 2*b*.

Water leaving the accumulator 2 flows through the downstream flow limiter 5 to the air gap 7. As best seen in FIGS. 7, 8 and 9, the air gap may be of any of a variety of air gaps characterized by gravity flow of reject water past an opening, window or air gap 88 that opens to atmosphere.

A preferred form of air gap 7 is illustrated in FIG. 7. It prevents backsiphoning of downstream drain water or reject water into the potable water system when an upstream vacuum condition develops in the supply water lines, or when a downstream high pressure condition develops in the drain piping.

The air gap 7 includes an elongated, vertically oriented cylindrical body 90 having a central hollow portion which opens laterally to atmosphere through an air gap window 88. The RO reject water flowing into the air gap drips downwardly from an air gap nozzle end fitting 94. The fitting 94 is push fitted at its upper end within the conduit 36, and grips the conduit by means of gripper ribs 98 like the ribs 58 described in connection with FIG. 5. A wider central portion of the fitting 94 is adhesively secured within the upper end of the body 90.

The base of the hollow portion of the body 90 is formed into a bowl shape to catch and generally radially inwardly direct the water dripping downwardly from the fitting 94. This causes the water to flow into the bore of an elongated lower extremity 92 whose upper portion is adhesively secured within the upper end of a rigid plastic pipe or connecting conduit 110.

The lower end of the extremity 92 is of a reduced diameter and includes ridges or ribs 100 like the ribs 58 illustrated in FIG. 5. These ribs 100 provide a fluid tight connection when the lower extremity is push fitted within a conduit 102 that, as will be seen, extends through the downstream accumulator 14 to a point near its lower extremity. At that point the conduit 102 preferably is discontinuous for reasons that will be described subsequently. It butts up in fluid tight relation with a conduit 103, which continues on down to the drain line.

The air gap body 90 includes a vent opening 104 that opens into a laterally directed side overflow port 106, as seen in FIG. 9, that projects out of the body 90. The purpose of this overflow port will be described later in connection with the operation of the downstream accumulator 14. Such a side port can also serve as a vent, and can be molded integral with the body 90, or molded separately and then adhesively secured in place when the body 90 is installed.

Figure 24:
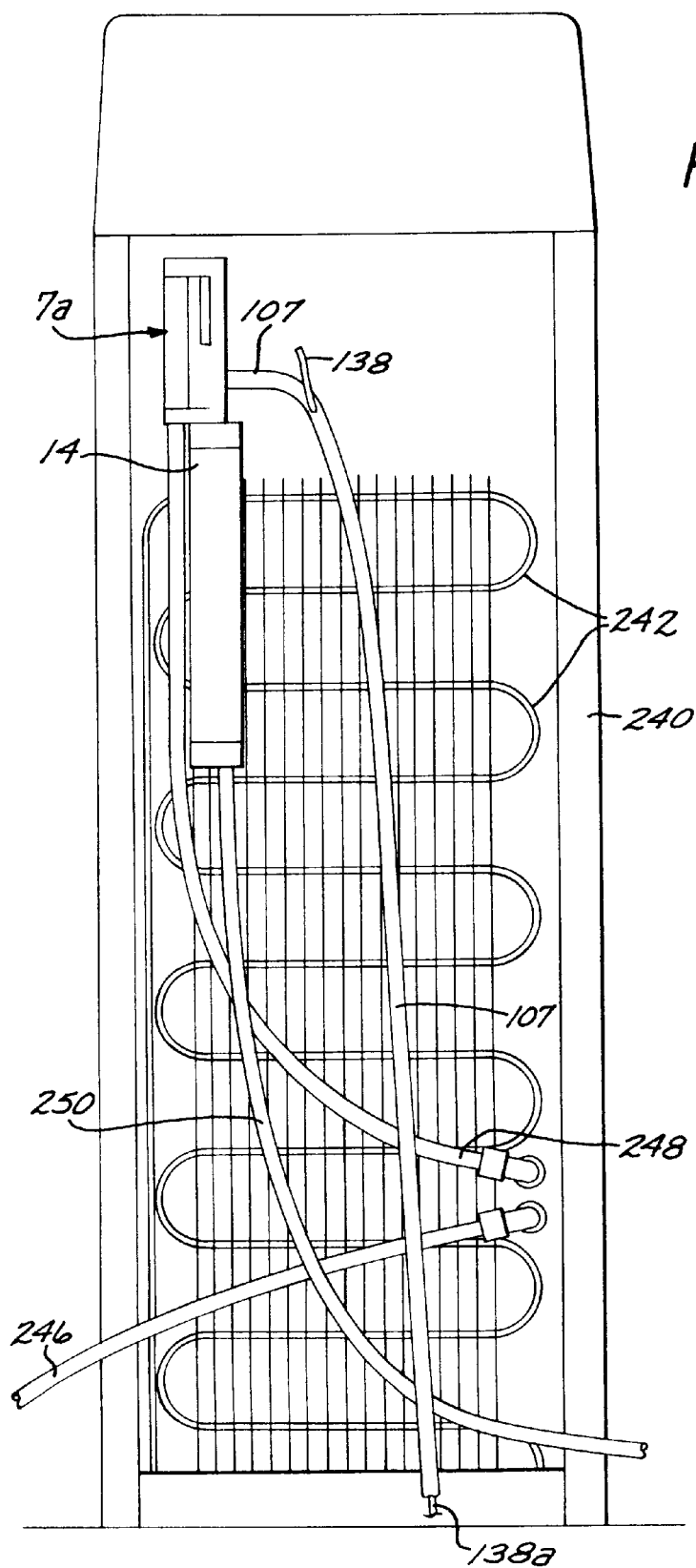
FIG. 24 is a rear elevational view of a reverse osmosis water cooler system incorporating a downstream accumulator according to the present invention.
Figure 25:
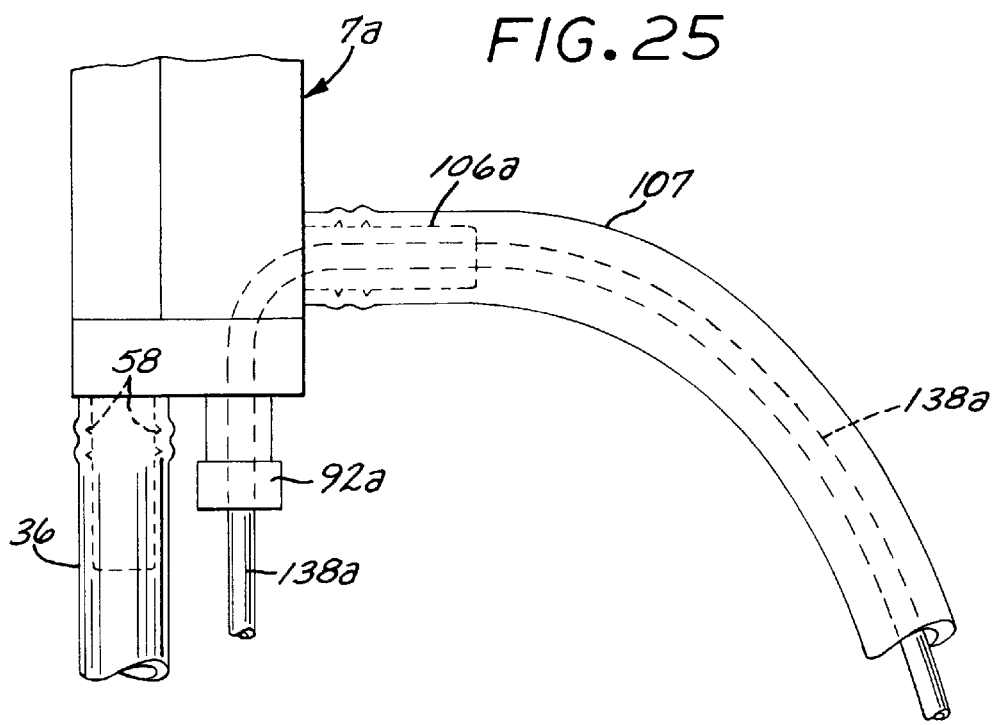
FIG. 25 is a detail view of a flexible plastic overflow tube connected to the side vent of the air gap unit, with a venting tube inserted into the overflow tube and extending into the upper portion of the downstream accumulator.

Another alternative is to employ a different air gap body 7*a*, as illustrated in FIG. 25, which has a port at its base for connection to the conduit 36. The inlet port has a smooth projection provided with the grippers 58 previously discussed. In this embodiment the side overflow port 106*a* of the air gap body 7*a* is push fit within the tubing 107. A vent tube 138*a*, like the tube 138 to be described in connection with FIG. 10, is passed through the tubing 107 and down into the upper portion of the accumulator 14. The vent tubing 138*a* can extend for some distance below the accumulator 14, for a purpose which will become apparent in the explanation of FIG. 24 later.

Figure 26:
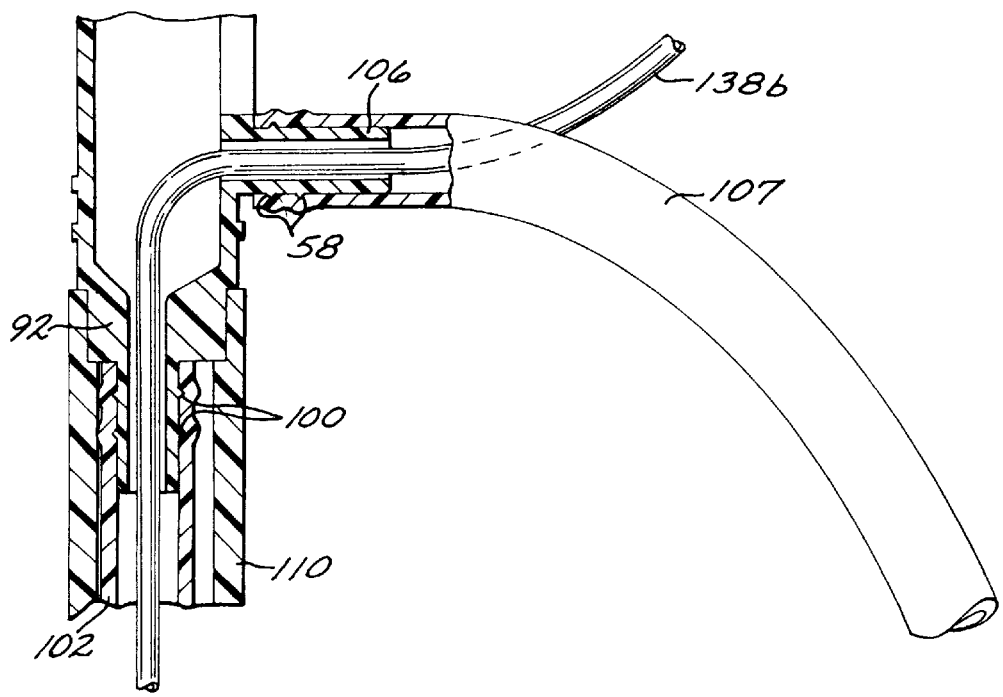
FIG. 26 is a detail view of the safety overflow port of FIG. 7, illustrating an embodiment in which a flexible plastic overflow tube is attached to the port, and a vent tube is disposed through the plastic overflow tube, and through the port and into the upper portion of the downstream accumulator.
Figure 28:
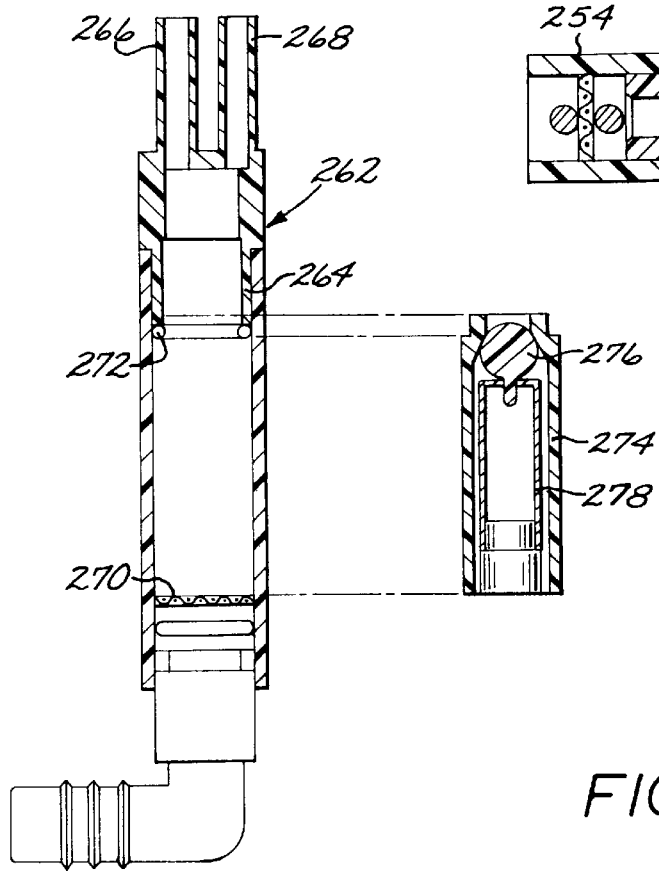
FIG. 28 is a longitudinal cross sectional view of another embodiment of backflow resistor.

In yet another variation illustrated in FIG. 26, the air gap body 7 of FIG. 7 can be provided with a vent tube 138*b* which is not disposed through the full length of the tubing 107, but instead is inserted at the upper portion of the tubing 107 as illustrated, and then disposed downwardly into the upper portion of the accumulator 14. Various other overflow and venting embodiments will suggest themselves to those skilled in the art.

The lower extremity of the conduit 110 is adhesively connected within the opening of the upper one of the three legs of a T-fitting 112 which forms part of the safety overflow and venting fitting 10, as seen in FIG. 10. The conduit 110 and fitting 112 are made of standard polyvinyl plastic material to facilitate such an adhesive connection.

The opposite or lower one of the legs of the fitting 112 is similarly adhesively attached to a cylindrical upper sleeve 114 which forms part of the downstream accumulator 14, as will be described.

The bore of the lateral leg of the T-fitting 112 slidably receives the cylindrical inner extremity of a hollow shunt housing 116.

The housing 116 includes an end wall 118 which closes off the outer side of the housing except for a pair of openings 120 and 122 extending through the wall 118 and communicating with the bores of a pair of tubular elements 124 and 126, respectively. The outer portions of the elements 124 and 126 are made smooth, while the inner portions are provided with the previously described ribs 58, so that flexible tubing 125 can easily be pushed onto and retained by the elements 124 and 126. The shunt housing 116 can be rotated to locate one of the elements 124 and 126 above or below the other, or both elements can be located in horizontal alignment for special venting and overflow conditions. The housing 116 is thereafter adhesively secured in position.

As best seen in FIG. 12, the opening 120 is larger than the opening 122 so that, depending upon the rotated position of a valve or shunt 128, more of the fluid in the housing 116, whether it be water or air, will flow through one of the openings 120 and 122 than through the other, or one or both of the openings 120 and 122 can be closed off.

As seen in FIG. 12A, the element 124 is located slightly radially inwardly of the element 126 so that there is room for a one-half inch PVC coupling to surround both elements with the tubing 125 in place on each.

A shunt 128 includes an opening 130, as seen in FIG. 13, which rotatably receives a pin integral with the housing wall 118 so that the shunt 128 can be rotated within the housing 116 across the inner face of the wall 118.

The shunt 128 is configured to include an integral arcuate diverter 132 which extends inwardly from the base of the shunt. The diverter 132 is operative to divert fluid one way or the other as the fluid flows toward the wall 118. During adjustment, the diverter 132 also provides a convenient means for rotating the shunt 128.

The base of the shunt 128 includes a generally arcuate edge 134 adjacent the center of rotation of the shunt 128, and, according to its rotated position, is operative to regulate or control the amount of fluid which can flow past the shunt through the opening 120.

The shunt 128 includes a smaller arcuate edge 136 located oppositely of the arcuate edge 134, and operative according to its rotated position to regulate or control the amount of fluid which can flow past the shunt through the opening 122.

With respect to the function of the fitting 10, it is important that the downstream accumulator 14 communicate with atmosphere through one or more vents, and it is also important that there be one or more emergency passages or outlets for water to flow to atmosphere, or to flow to collection containers located externally of the accumulator. This enables significant backflows of contaminated water from the drain lines to be shunted out of the system well before such backflows can rise and possibly reach the air gap 7.

Thus, air from the accumulator can be vented through one or both of the elements 124 and 126 of the fitting 10, and rising backflow water is enabled to flow through one or both of the elements 124 and 126, and also through the air gap side vent 106. If high volumes of backflowing water are anticipated, additional fittings 10 can be inserted in the drain lines, as will be apparent.

FIGS. 10 and 11 also illustrate an additional or alternative form of venting of the accumulator 14 by means of a flexible plastic tube 138. The tube 138 is introduced through a slightly oversized opening provided in the connecting conduit 110. Its upper extremity is preferably held in place by tape 139 wrapped around it and around the adjacent conduit 110. The tube 138 also extends through an oversized opening provided in the conduit 102.

The tube 138 can be terminated at any desired height within the conduit 102, but preferably it extends into the interior of the conduit 102 to a point just above where the end of the conduit 102 butts up against the conduit 103. As illustrated, the tube 138 passes longitudinally downwardly within the conduit 102, past the safety and overflow fitting 10 and into the upper part of the accumulator.

The tube 138 performs several dual functions. It extends into the accumulator 14 to vent the accumulator to atmosphere and thereby aid in the periodic filling and emptying of the accumulator. It also provides venting through its oversized entry opening into the interior of the tube 102.

The tube 138 further provides a small, longitudinally extending low friction element in the flow path of the RO reject water. Water can in effect slide down the exterior of the tube 138. It has been found that this eliminates or greatly reduces the dripping sound of water that would otherwise occur. Instead of dripping into the larger volume accumulator, the water is able to move down the length of the tube 138.

It has also been found that the dripping RO reject water flows more easily and efficiently along the tube 138 within the tube 102, as compared to a random flow through the tube 102 of slugs of water separated by air ingested at the air gap, which is the usual noisy flow pattern in the prior art. The presence of the tube 138 results in a lower resistance to flow and a noticeable increase in the volume of water flow. This easier flow is important to reduce buildup or accumulation of RO reject water in the drain lines that could possibly reach and contaminate the air gap 7 or undesirably escape out of one or more of the emergency overflow ports in the system.

As previously indicated, efforts have been made in the past to prevent unusually high velocity spurts or pressure surges from the drain or sewer lines from bridging the air gap 7 and thereby possibly contaminating the potable water supply. Surge deflectors such as that shown in my U.S. Pat. No. 5,176,165 are one means to shunt away such backup spurts or pressure surges. The use of the generally vertically oriented downstream accumulator 14 according to the present invention is another means for accomplishing this, but in a totally different manner.

More particularly, RO reject water enters the accumulator 14 through the central conduit 102, as seen in FIG. 14. The conduit 102 extends through an elongated, cylindrical sleeve 140 along the longitudinal centerline of the sleeve.

As previously indicated, the upper extremity of the sleeve 140 fits within and is adhesively secured to the upper sleeve 114, while the lower extremity of the sleeve 140 is similarly adhesively secured within a lower sleeve 115.

The upper sleeve 114 is adhesively secured within the lower leg of the T-fitting 112, which forms a part of the safety overflow and venting fitting 10. The lower sleeve 115 is adhesively secured within a central recess in a lower end fitting 150. The fitting 150 also includes a central blind bore through which the conduit 102 extends. A pair of O-rings 80 are seated within the blind bore in engagement with the conduit 102 to provide a fluid tight relation.

In the embodiment illustrated in FIG. 14, the conduit 102 is continuous to the bottom of the accumulator, where it abuts against the conduit 103. With this arrangement, if there is a blockage of reject water downstream of the accumulator 14, the water will rise in the central conduit 102, and preferentially flow out of one or more openings 142 which are provided in the conduit 102 adjacent the bottom of the accumulator. In certain situations where venting or flow requirements are higher, the openings 142 can be provided at additional locations, or even along the complete length of the conduit 102.

The water leaving the openings 142 will flow into the annular space formed between the conduit 102 and the sleeve 140. If the RO unit is operable at the time of any blockage, this flow will continue through the openings 142 until either the blockage is removed or the RO unit is shut down.

If the annular space is filled, eventually the collected water in the annular space will overflow out of one or both of the tubular elements 124 and 126 of the fitting 10, thereby preventing the water from reaching the air gap 7. In this regard, the position of the shunt 128 will previously have been positioned to shunt the reject water out of one or both of the tubular elements 124 and 126, as desired. In addition, or alternatively, depending upon whether the side vent 106 is provided and whether the reject water rises up to that height, the reject water may spill out of the vent 106.

Further, the air escaping from the accumulator as it is being filled is vented first out the element 126, then the element 124, then out of tube 138, and finally out of the side vent 106.

The upper terminus of the tube 138 can initially be placed at a height to maintain venting, as long as possible, and to delay as long as possible the use of the tube 138 as a spill path for rising water. This would mean location of the upper end of the tube 138 just slightly below the air gap window 88 and vent opening 104.

In this regard, it should be understood that the present system includes various redundancies, and that the number of overflow conduits, venting ports or the like that are used will vary according to the requirements of each particular application.

When the blockage is remedied, any water collected in the accumulator flows out of the annular space through the openings 142, and into the conduit 102 for passage toward the drain. In this manner the accumulator has the effect of evening out the flow of reject water to the drain, as well as preventing backflow of high pressure surges and the like.

In conjunction with the action of the tube 138 as previously described, the walls of the accumulator provide a sound damping or attenuating effect to mask any sound of the forward flowing reject water falling into the interior of the accumulator. Also, chemically treated particulate matter 37 can be placed in the accumulator, as previously described, to attenuate the sounds of dripping RO water and entrained air.

The diameter and length of the accumulator, and the spacing of its components, can be varied according to the performance and capacity desired. The materials used are also within the discretion of the user, a transparent or translucent material being favored to visually apprise the installer or service technician respecting the performance conditions of the system, including the amount of water collection in the accumulator.

The larger diameter outer sleeve 140, compared to the tube 102 passing through it, constitutes a large space within which any high velocity backflow of contaminated water has an opportunity to dissipate its force, greatly slowing and absorbing the velocity of the backflow. Even if no shunting of such backflow were provided by special safety overflows and the like, the capacity of the accumulator 14 would in all likelihood completely prevent any backflow surge from reaching the air gap 7.

FIG. 15 illustrates another accumulator embodiment. Many of the components are identical to the embodiment of FIG. 14, and identical numerals are therefore used. If the components are modified but perform essentially the same function, the identical numerals are used, but with the subscript "a".

The outer sleeve 140a is larger in diameter than the sleeve 140 of the first embodiment of FIG. 14. This provides room for the single tube 102 to be cut into discontinuous, side-by-side lower and upper tube sections 144 and 146. With this arrangement backflowing water can flow into the outer sleeve 140a not only by means of the openings 142, but by means of the opening in the upper end of the lower tube section 144. The larger outer sleeve 140a also more readily accommodates the particulate matter 37 which may surround 144 and 146, as previously mentioned in connection with the embodiment of FIG. 2.

The upper and lower sleeves 114a and 115a are also made larger in diameter than in the embodiment of FIG. 14 to fit within the larger T-fitting 112a and the lower fitting 150a, and the larger outer sleeve 140a fits over and is adhesively secured to these fittings, as seen in FIG. 15.

The cut ends of the tube 102 overlap, as illustrated, the lower tube section 144 extending up and terminating adjacent the upper sleeve 114a, while the cut end of the upper tube section 146 extends down and can terminate anywhere in the lower portion of the outer sleeve 140a, but preferably adjacent the lower sleeve 115a. In most other respects the two embodiments are identical.

In operation of the embodiment of FIG. 15, RO reject water passes out of the lower end of the upper tube section 146 and flows into the space in the accumulator outer sleeve 140a. The water in this space tends to reach a level at which it stays during normal flow rate operation. This is accomplished by adjusting the various orifices and flow limiters, and the size and number of the tube openings 142 through which the water enters the lower tube section 144 for passage to the drain, so that the rate of flow of RO water into the drain is optimum. Of course, the vent tube 138 and whatever other vent passages are provided will be venting air to permit the water to flow out of the accumulator 14a, as will be apparent.

With this arrangement a drop in the level of the water in the accumulator 14a will usually be indicative of an increase in the efficiency or production rate of the RO unit. On the other hand, an increase in the water level would usually be indicative of a drainage problem, perhaps an incipient blockage or perhaps indicative or decreasing RO efficiency. Since the outer sleeve 140a is transparent, the accumulator thus becomes a useful visual diagnostic tool for the skilled maintenance of service person to service or monitor the operation of the overall RO system.

In this regard, the exterior of the outer sleeve 140a can be provided with index or graduation markings or the like (not shown) to enable reading and comparison of the water levels at different times during the operation of the RO system.

Also, the tube 138 can be made to terminate adjacent the lower end of the tube section 146, if desired, to enhance the noise free flow of water, as described above in connection with the embodiment of FIG. 10.

The accumulator 14*a* is useful in another way. If the drag or resistance to water flow through the drain line downstream of the accumulator is too high the water simply will not flow out of the terminus of the drain line. This could occur if the length or run of the drain line to the drain itself is too great, or if the water has to flow upwardly against gravity a short distance in order to empty into a toilet tank, which is often the case for an office RO water cooler.

As a consequence, RO water will back up into the accumulator 14*a* and develop a pressure head, according to the increased level of water in the accumulator. At some critical level the pressure head will be sufficient to overcome the resistance to water flow through the drain lines. The critical level can be determined through experience in running the RO system, or by extrapolation from operating tests. Sometimes the critical level will not be reached until the water level rises to the open upper end of the lower tube section 144.

Actual tests have demonstrated that once the proper pressure head has been reached, the water will move with a swoosh or rapid rate flow through the drain lines. The action is cyclical, and water flow resistance will again develop in the drain lines, and again this will continue until the critical water level is reached at which the water will then rapidly drain, as just described. This arrangement is discussed further in connection with the embodiment of FIG. 24, which is illustrative of an office RO cooler installation in which reject water must flow for some distance, and to higher elevations, for emptying into a suitable drain.

In addition to the accumulator 14 and other means described above for stopping or attenuating a high rate backflow, a flow limiter 46 like the flow limiter 38 can be located in the drain line downstream of the accumulator. Use of the flow limiter 46 may appeal to a user who wants to provide optimum protection against possible contamination of the potable water system by such backflows. In this regard, a form of unidirectional flow resistor 17 is illustrated in FIG. 17 which is effective to restrict and severely limit both slow rising and high rate or surge backflows.

Figure 17:
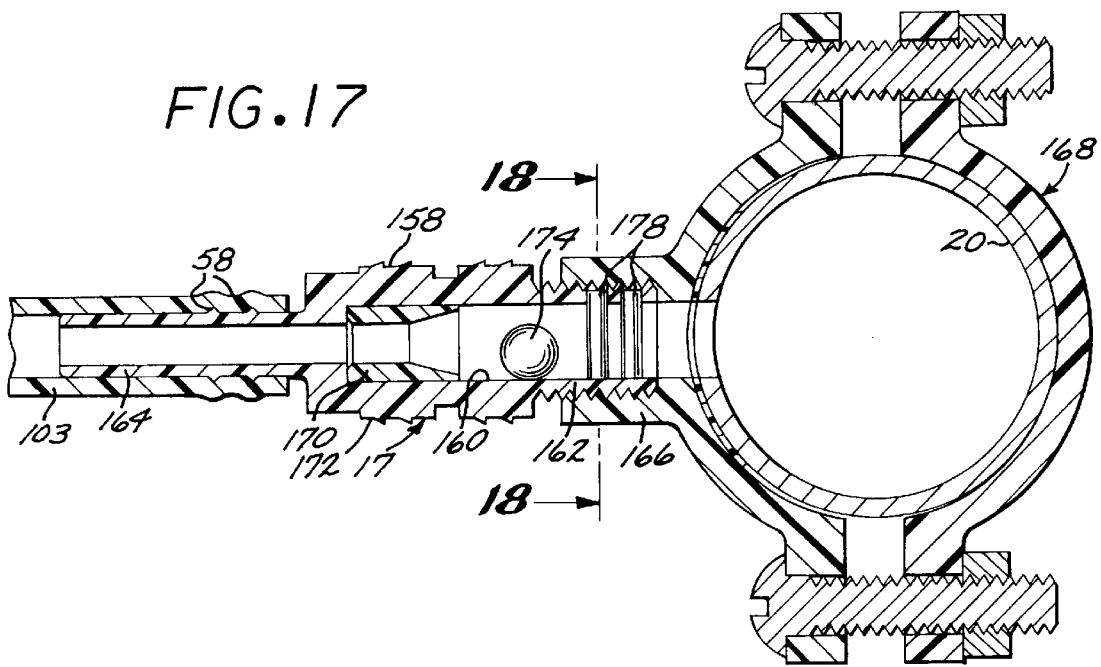
FIG. 17 is an enlarged longitudinal cross sectional view of the saddle clamp mounted to the drain line leading to the sewer, and also illustrating one form of flow resistor for blocking high velocity backflow of sewage water.
Figure 18:
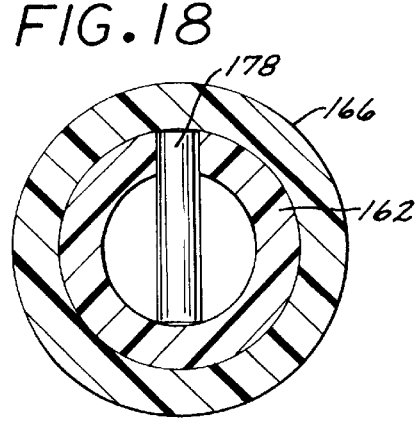
FIG. 18 is an enlarged view taken along the line 18—18 of FIG. 17.

As seen in FIG. 17, the flow resistor 17 comprises an elongated body 158 having a hollow portion or bore 160. Although any suitable manner of connection can be used, the body 158 includes a centrally bored and threaded extremity 162 at one end, and a smaller diameter centrally bored smooth element 164 provided on its exterior with the gripping ribs 58 previously described.

The element 164 is connected by push fit to the conduit 102 downstream of the T-fitting 48 seen in FIG. 1, whereas the threaded extremity 162 is threaded into an internally threaded boss 166 of a usual and conventional drain saddle clamp 168. If desired, the extremity could be adhesively secured in a suitable unthreaded opening in the boss 166, as will be apparent.

Water flowing from the conduit 102 passes through the hollow bore of the element 164, through the hollow bore 160 of the flow resistor body 158, and through the usual saddle clamp opening into the drain line 20 and P-trap 22.

Water backflowing through these same passageways is resisted and stopped by the flow resistor elements within the resistor body bore 160. More particularly, a centrally bored cylindrical valve receptacle 170 is press fit, adhesively secured or molded within the outer end of the body bore 160. The inner end of the receptacle 170 includes a conical seat 172 which is adapted to closely receive a valve ball 174 in sealing relation when the ball is moved by the action of the backflowing water. This positively stops most flows. It is particularly effective against surge backflows, which are potentially the most difficult form of contaminating backflow to manage.

Foreign material which may be carried by the backflowing water cannot adversely affect the sealing relation between the ball 174 and the seat 172 because of the presence of one or more filters or screens 176 which are located downstream in the outer extremity of the bore 160. The size, number and orifice size of the screens is determined according to the particular application. The screens may each be made of intersecting strands, and placement of one screen over another, with the orientation of the strands also varied, presents yet another method of adjusting the materials the screens 176 will block. Only one screen 176 is shown for purposes of illustration, but several may be used in stacked relation if desired.

Figure 19:
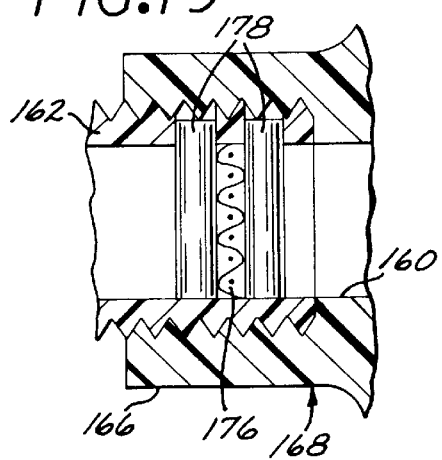
FIG. 19 is an enlarged detail view of the flow resistor of FIG. 17, illustrating the inclusion of a filter or screen in the flow resistor assembly.

The screen 176 is quickly and easily located in proper position through the use of a pair of pins 178, preferably in the form of cut sections of small diameter plastic tubing. These are driven through suitable openings in one or both walls of the threaded extremity 162 on opposite sides of the screen 176, and trapping it in position, as best seen in FIG. 19. When replacement of the screen 176 becomes necessary, the body 158 is easily unthreaded from the boss 166, and the pins 178 can then be easily driven or pulled out of the openings in the extremity 162.

Even in a worst case scenario in which foreign particles build up on the ball 174 and prevent an adequate sealing relation with the seat 172, the present system includes numerous protections against the passage of backflowing water to the air gap unit, as previously described. Consequently, use of a unidirectional flow resistor such as the flow resistor 17 should not be rejected out of hand because of any concern that, like prior art check valves, it may clog and allow passage of backflowing drain or sewage water.

The present system includes an automatic shut down valve 20 to prevent the RO system from continuing to generate RO reject water whenever there is a drain line blockage. Unlike all known prior art RO systems, the valve 20 can detect such blockages and shut off the feed water to the RO unit. Whenever there is a downstream blockage which results in a backflow of contaminated water from the sewage pipe, it is important that a backflow be detected as soon as possible so that the relatively high pressure supply water to the RO unit can be cut off. Otherwise, the RO unit will continue to operate, and reject water from the RO unit will continue to flow into the drain system and the downstream contaminated water will more quickly backfill the drain lines and likely cause flooding out of the lowest available opening.

As the contaminated RO reject water backfills the drain system downstream of the air gap, it will eventually reach, contaminate and flood out the air gap. Also, if an air gap faucet is being used, the contaminated water will flow out onto the sinktop and into the sink and onto the kitchen counter or floor once the sink is filled.

The shutdown valve 20 is preferably located at a suitably low level so that it can sense when backflow water has risen in the drain system to a significant height. However, the valve should not be located so low that it will respond to insignificant or small, intermittent rises of drain water above the connection of the drain system to the sewer pipe. These small rises usually do not constitute blockages, and occur often enough that they are better ignored, rather than constantly interrupting the supply of water to the RO unit.

As will be seen, the present shutdown valve and its components are preferably made of moldable plastic material. Its operation is based upon the effect of differential water pressures in the valve. A prior art float valve (not shown) could be installed to react to backflowing water, but this would require an electrically operative solenoid and switch. In contrast, the present valve 20 requires no electricity or solenoids or switches. Even the resetting of the valve from its shutoff position is manual, but it should be noted that necessity for such resetting apprises the owner of a system malfunction needing correction.

Referring now to FIGS. 20–23, the valve 20 comprises a cylindrical housing having an upper section and a lower section that are preferably separately molded and then adhesively secured together to define an upper pressurizable chamber 180, and a lower unpressurized chamber 182.

The lower end of the chamber 180 is defined by a cylindrical lower portion 200 of a water inlet structure 190. The structure 190 also includes a cylindrical upper portion 206 spaced above the lower portion 200 to define a source water entry chamber into which source water can enter through an inlet port 214 that is adapted to be connected to the conduit 26, as shown in FIG. 1.

The peripheries of the portions 206 and 200 are provided with O-rings 208 and 202, respectively, to establish a water tight relation with the adjacent walls of the chamber 180.

The unpressurized lower chamber 182 vertically slidably receives a cylindrical float 184 which has an integral, upwardly extending pusher stem 186. The stem 186 is vertically slidable within a downwardly open cylindrical magnet recess 188 formed in a vertically oriented, cylindrical central magnet structure of the water inlet structure 190.

Backflowing drain water can enter the lower chamber 182 through an inlet fitting 192 which is adapted for connection to the conduit 50, as illustrated in FIG. 1. Although not shown, it would be advisable to include a system component which includes filters or screens to keep foreign matter from entering the chamber 182. The bottom of the chamber 182 includes upwardly directed projections 194 which maintain the float 184 above the base in the normal or lower position of the float, and prevent sticking of the float 184 to the chamber base. This arrangement also allows backflowing drain water to easily flow beneath and readily raise the float 184. The chamber 182 is provided with vents 183 to vent the chamber during vertical movement of the float 184.

When the float 184 rises it moves the loosely fitting pusher stem 186 upwardly into contact with a small cylindrical lower magnet 196 that is vertically slidable in the upper portion of the same magnet recess 188 which slidably receives the stem 186.

The upper end of the magnet recess 188 is closed by a relatively thin partition or wall 198 which forms part of the magnet structure, the magnet structure in turn being a part of the water inlet structure 190. A magnet recess 204 similar to the magnet recess 188 is located above the recess 188. The recess 204 vertically slidably receives a magnet 210 that is similar to the magnet 196 except that it is of opposite polarity. Both magnets are provided with a plastic coating to stop corrosion and reduce friction between the magnets and their adjacent surfaces.

The recess 204 extends upwardly from the separating wall 198, and into communication with an opening in the upper portion 206.

Source water entering from the inlet port 214 can pass from the chamber 180 through openings 212 that are in communication with the magnet recess 204. The base of the upper magnet 210 is smaller in diameter compared to the upper portion of the magnet defining a shoulder 211. This allows the entering water to act upon the shoulder and base of the magnet 210. In addition, the larger diameter upper portion of the magnet 210 is made suitably smaller in diameter than the diameter of the magnet recess 204 so that entering water can normally flow past the magnet and enter the central bore of a water exit structure 216 located above the water inlet structure 190.

The structure 190 comprises a central column 218 having a hollow bore 217 provided with a cylindrical recess in its base to retain an O-ring 220. The upper end of the upper magnet 210 is conical so that when the magnet moves from the illustrated lower or normal position to an upper position, the conical surface of the magnet will engage the O-ring 220 and prevent water flow into the bore 217 from the magnet recess 204.

The water exit structure 216 includes a cylindrical lower portion 222 which has a circumferential O-ring 224 to provide a water tight seal with the adjacent wall of the upper chamber 180. In addition, the bore 217 closely receives a vertically elongated reset plunger 226 which is characterized by a central portion having an O-ring 228 to provide a fluid tight relation and accompanying frictional resistance to vertical movement relative to the adjacent walls of the bore 217.

The lower part of the plunger 226 includes a lesser diameter probe 230 which, in the lower or normal middle position of the plunger 226, rests at a predetermined spacing above the conical point of the upper magnet 210. In this normal or middle position water can flow upwardly past the O-ring 220 and into the bore 217. From there the water can pass through exit openings 232 provided in the central column 218 of the water exit structure 216, and into an upper chamber in communication with an exit port 234 that is adapted to be connected to the conduit 51 supplying source water to the RO unit 9.

The upper extremity of the central column 218 is adhesively secured within a cylindrical cap 236 which in turn is adhesively secured within a complemental opening in the upper wall of the upper section of the shutoff valve 20. In addition, the cap 236 includes a central opening to slidably receive a reduced diameter upper extremity of the reset plunger 226. The difference in diameters defines a shoulder 238 which engages the cap 236 in the upper or shutoff position of the plunger 226.

In operation, in the normal or lower position of the magnet 210, source water can flow through the inlet port 214, through the openings 212, into the magnet recess 204, upwardly past the magnet 210 and beyond the O-ring 220. Next, the water exits the openings 232 and flows out of the exit port 234 to supply source water to the RO unit 9.

Assuming now that a backflow of drain water enters through the inlet fitting 192, it will act against the base of the float 184 to raise it. The float pusher stem 186 immediately engages and raises the lower magnet 196. The raised magnet 196 is then close enough that its magnetic force repels and moves upwardly the upper magnet 210.

In the raised position of the magnet 196, incoming water acts against the shoulder 211 causing the conical head of the magnet 210 to engage the O-ring 220. This cuts off any further flow of water out of the openings 232 to the exit port 234. This in turn cuts off the supply of source water to the RO unit 9 so that the RO unit stops generating further reject water that would otherwise compound the sewage stoppage by filling all the drain lines beyond whatever safety overflow or vent ports are in the system.

The raising of the plunger 226 causes the shoulder 238 to engage the cap 236, stopping further upward travel of the plunger 226. The frictional effect of the O-ring 228 keeps the plunger stationary except when it is fully raised by water pressure acting upon the shoulder and base of magnet 210. The source water entering the inlet port 214 acts against the undersides of the upper magnet 210, as just mentioned, keeping it seated tightly against the O-ring 220, and preventing any water flow into the bore 217 and out of the openings 232.

Although not shown, a colored ring is preferably painted or otherwise placed on the upper extremity of the plunger 226 so that it will show when the shutoff valve 20 has been actuated. The homeowner or user will then be apprised of the actuation so that when the drain blockage is cleared, and water drains out of the lower chamber 182, the user can simply press the plunger fully downwardly to reseat the magnet 210. The user then pulls the plunger 226 upwardly to the mid-position for normal operation. This mid-position allows the magnet 210 to travel upwardly without friction until inrushing water acts against the shoulder 211.

FIG. 24 illustrates an RO office water cooler which is usually small and portable enough that it can be located at some convenient place in an office. Often its location is not near a conventional drain or sewer line, and the drain from the RO office cooler is arranged in order to discharge into a sink or toilet tank of a nearby restroom. For this reason the resistance to flow of the RO reject water must be made as low as possible, and some means must be provided to enable the reject water to flow some distance to the discharge point, and also to flow to a greater level where the discharge point is a sink or toilet tank located above the level of the RO unit reject water outlet.

In the embodiment illustrated, the RO office cooler comprises, generally, an upright frame 240 within which the RO unit is located. In addition, usual cooling coils 242 and coil supporting gridwork 244 are secured to the back of the frame 240.

Water is supplied to the RO unit within the frame 240 by a conduit 246, while the RO reject water from the internally mounted RO unit is carried by a conduit 248 to the inlet port of the air gap unit 7a. In this particular embodiment the air gap unit 7a is mounted on top of the downstream accumulator 14, which is preferably transparent or translucent in order to serve as a diagnostic aid for a service technician or the like.

The outlet from the accumulator 14 is connected to a drain conduit 250 which carries the reject water to building drain piping or, as previously indicated, to a toilet tank or to a suitable drain collection receptacle (not shown).

The side vent or safety overflow tubing 107 extends out of the safety air gap body and down the full height of the water cooler. This prevents any reject water overflowing from the air gap unit from draining down the back of the water cooler frame 240, and possibly into the frame, where it might short out electrical connections (not shown).

The tube 138 also extends downwardly in the tubing 107, terminating wherever desired, but preferably it extends the full length of the tubing 107. Its presence, as previously explained, enhances the ability of the reject water to flow through the tubing 107 quietly and at an optimum rate and volume.

The upper end of the tube 138 can, if desired, extend out of the tubing 107 to vent the tubing 107 to atmosphere. It could, however, be arranged to extend through the upper portion of the tubing 107 and downwardly into the upper portion of the downstream accumulator 14, as previously described in connection with the embodiment illustrated in FIG. 25. In that instance, the presence of the tube 138 would enhance the flow of water out of the accumulator 14, and quiet the sound of the flowing water, as previously explained.

In addition, as particularly described in connection with the embodiment of FIG. 15, the level of water building up in the accumulator can be adjusted so that periodically the water will rise to a critical level, following which the water will suddenly flow at a relatively high rate through the drain conduit 250. This phenomenon carries the reject water greater distances and to higher end point discharge levels, as compared with conventional drip flow of reject water through the drain lines. This is important where water cooler lines extend for considerable distances.

FIGS. 27, 28, 29 and 30 illustrate alternative versions of components already described. In most instances they function in the same way, but differ in the manner of mounting, in additional features, or additional versatility.

Figure 27:
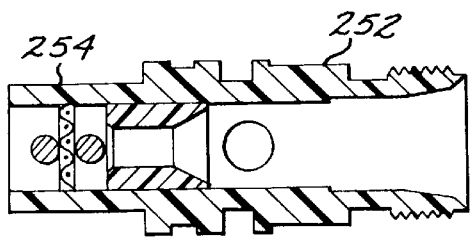
FIG. 27 is an enlarged longitudinal cross sectional view of another embodiment of flow limiter.

More particularly, FIG. 27 illustrates a form of flow resistor 252 like the flow resistor 17 of FIG. 17. However, the resistor 252 includes a ball 174 which, as will be seen, enables the resister 252 to provide a bidirectional action.

The flow resistor 17 is characterized by a longitudinally elongated smooth end element 164 which enables a push-on connection with flexible conduit 103, as previously described. On the other hand, the resistor 252 includes a larger diameter smooth surfaced extremity 254 which permits the extremity 254 to be coupled to a commercially available quick connect push over fitting (not shown, but "John Guest" type or the like, designed to avoid stress cracking of plastic tubing).

The extremity 254 also is sized for insertion within the end opening of rigid PVC conduit, where it can be adhesively secured in position if desired.

The embodiment is illustrative of the various end connections to which the components of the present invention lend themselves.

Figure 29:
FIG. 29 is a longitudinal side elevational view of another embodiment of adjustable flow limiter.

FIG. 29 is also illustrative of this versatility. The flow limiter 256 illustrated also includes a larger diameter smooth surfaced extremity 258 adapted for coupling to the commercially available quick disconnect push over fitting just mentioned. The extremity 258 includes an internal ball seat 259, shown in dotted outline in FIG. 29, at its bore entrance. With this arrangement the flow limiter 256 can be combined with the flow resistor 252 so that the combination can conveniently provide both flow limiting and flow resisting functions. To accomplish this the valve seat 259 is removed, and extremity 258 is inserted into the bore of the threaded end of the flow limiter 252 and adhesively or otherwise secured in position, as by a compression nut (not shown). The adhesive connection is shown in FIG. 27. The flow resistor ball 174 will the engage the seat 255.

It is noted that the limiter 256 is the original part from which the limiter 5 of FIG. 5 is made, as by cutting the limiter 5 at its juncture with the larger diameter extremity of the limiter 256. The function of the two limiters is the same.

The limiter 256 is capable of use in conjunction with the accumulators 14 and 14a illustrated in FIGS. 14 and 15. As will be apparent the limiter 256 can also be used in combination with the accumulators illustrated in FIGS. 2, 3, 4, or 15, if desired.

In particular, the conduit 103 can be removed from the lower portion of the end fitting 150 in FIG. 14, and the extremity 258 of the limiter 256 inserted instead and adhesively secured in position. The same substitution can be made at the bottom of the end fitting 150a. The arrangement provides a flow limiter as an integral part of the associated accumulator, which is very convenient in marketing an accumulator having an already adjusted flow limiter.

Figure 30:
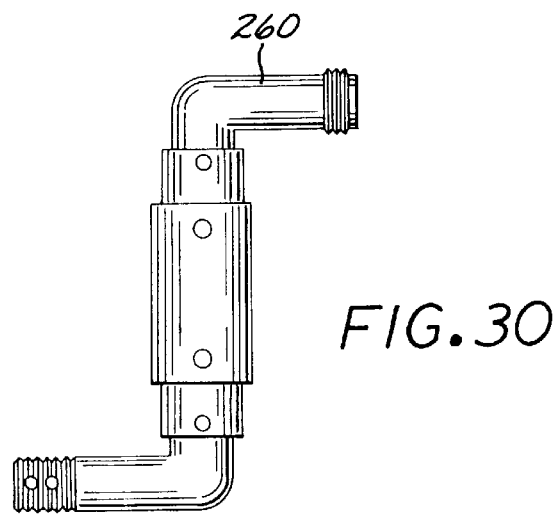
FIG. 30 is yet another form of backflow resistor.

FIG. 30 illustrates a Z-shape component which normally serves as a backflow surge resistor 260 similar to the resistor 17 of FIG. 17. In such an application it would include internal components like those of resistor 17, but with the additional capability of 360 degree adjustment of each of the end extremities. O-rings (not seen) are located in the extremities to enable such rotation without permitting fluid leakage. In addition, if the internal components of the resistor 260 are removed, the resistor 260 is capable of serving as a small accumulator like the accumulator 14, with less capacity of course. This second accumulator constituted of the resistor 260 could be located, for example, just downstream of the accumulator 14.

The backflow resistor 262 of FIG. 30 can be substituted for the resistor 17 of FIG. 17. It includes a body 264 provided at the top with an inlet port 266 and a vent port 268. It also includes a screen 270 at the base of the body 264 to screen out backflowing foreign material, and an O-ring 272 which permits relative rotational movement of the interfitting upper and lower portions of the body 264.

The resistor 262 further includes an internal cylindrical case 274 which closely fits within the lower portion of the body 264, and which includes a ball seat at its upper extremity for seating a special ball 276 to block backflowing water from the downstream drain lines and fittings.

The ball 276 is formed or ground to provide a precision spherical upper portion, and is resilient but not particularly buoyant, so it will not normally rise to the ball seat in the presence of slowly rising backflow water. However, the ball 276 includes an integral downward projection which, by reason of its resilience, can be forced downwardly through an opening in the upper end of a cylindrical buoyant float 278 located and vertically slidably movable within the case 274. The buoyancy of the float 278 causes it to rise and seat the ball 276 against the ball seat, even in the presence of slowly rising backflowing water. A sudden surge of backflowing water is not necessary to cause such seating, so the resistor 262 is very sensitive and responsive to slowly rising backwater or surge backflow. A plurality of guides or rails 277 are preferably formed on the inner surfaces of the case 274. They are equally circumferentially spaced apart, and extend longitudinally to reduce adhesion of the float 278 to the case 274 and facilitate its vertical movement relative to the case 274.

The case 274 can also be adapted to serve as a small accumulator in certain applications. For such a use the float 278 and ball 276 and case 274 would be removed, and the vent port 268 would operate similar to the vent port 124 of FIG. 12a.

From the foregoing it will be seen that the flow limiters, such as that of FIGS. 5 or 29, provide substantial or total blockage of backflowing water; and the downstream accumulators, such as accumulator 14, function to collect or drain away any backflow escaping the flow limiters, while also performing its important function of muffling the flow of drip rate RO reject water flowing toward the drain line. There are a considerable number of combinations of the disclosed components that can be made to achieve optimum operation of the system under various conditions.

What is claimed is:

1. In a reverse osmosis system which includes reverse osmosis means for producing potable water and accompanying reject water, first conduit means for carrying the reject water to a backflow prevention device and second conduit means for carrying the reject water from the backflow prevention device to a drainage conduit for emptying into a sewer system, the backflow prevention device being characterized by an air gap operative to reduce to atmospheric pressure the pressure of the reject water downstream of the backflow prevention device, the improvement comprising:

a water collection chamber defined by an outer wall mounted in fluid tight relation around the second conduit means, the second conduit means including an open portion opening into the water collection chamber whereby any excess flow of reject water from the backflow prevention device and any back flowing water from the drainage conduit is enabled to flow through the open portion and collect in the water collection chamber and, whereby in the absence of any excess flow or back flowing water, any water collected in the water collection chamber is enabled to drain out of the water collection device and into the drainage conduit.

2. A reverse osmosis system according to claim 1 and including water treatment particulate matter in the collection chamber.

3. A reverse osmosis system according to claim 1 wherein the water collection chamber is substantially vertically oriented and the open portion is defined by an opening in the wall of a lower part of the second conduit means.

4. A reverse osmosis system according to claim 1 wherein the water collection chamber is substantially vertically oriented and the open portion is defined by openings in a lower part of the second conduit means and in the upper part of the conduit means, respectively.

5. A reverse osmosis system according to claim 1 wherein the outer wall of the water collection chamber is elongated, generally cylindrical, rigid and radially inexpansible, and attached at one end to the backflow prevention device, and including at the other end an end fitting engaged upon the conduit means.

6. A reverse osmosis system according to claim 1 wherein the water collection chamber is substantially vertically oriented, and the second conduit means is discontinuous, the open portion opening into the water collection chamber comprises an open upper end of the upper portion of the second conduit means, and any water collected in the water collection chamber is enabled to flow out of the water collection chamber through the open upper end of the lower portion of the second conduit means.

7. A reverse osmosis system according to claim 6 wherein at least a portion of the water collection chamber is made of transparent material whereby the level of water in the water collection chamber can be seen.

* * * * *